United States Patent
Catelli et al.

(10) Patent No.: US 12,291,412 B2
(45) Date of Patent: May 6, 2025

(54) SYSTEM AND METHOD FOR EMPTYING A BOX

(71) Applicant: CFT S.P.A., Parma (IT)

(72) Inventors: Roberto Catelli, Parma (IT); Alessio Lazzari, Viadana (IT); Gianluca Scaramuzza, Noceto (IT)

(73) Assignee: CFT S.P.A., Parma (IT)

( * ) Notice: Subject to any disclaimer, the term of this patent is extended or adjusted under 35 U.S.C. 154(b) by 242 days.

(21) Appl. No.: 17/923,173

(22) PCT Filed: May 13, 2021

(86) PCT No.: PCT/IB2021/054094
§ 371 (c)(1),
(2) Date: Nov. 3, 2022

(87) PCT Pub. No.: WO2021/229489
PCT Pub. Date: Nov. 18, 2021

(65) Prior Publication Data
US 2023/0159285 A1   May 25, 2023

(30) Foreign Application Priority Data

May 14, 2020 (IT) .................. 102020000011065

(51) Int. Cl.
*B65G 65/23* (2006.01)
*B25J 9/16* (2006.01)
*B25J 15/00* (2006.01)
*B25J 15/02* (2006.01)
*B65B 69/00* (2006.01)
*B65G 59/02* (2006.01)

(52) U.S. Cl.
CPC ............ *B65G 65/23* (2013.01); *B25J 9/1697* (2013.01); *B25J 15/0014* (2013.01); *B25J 15/0293* (2013.01); *B65B 69/00* (2013.01); *B65G 59/02* (2013.01)

(58) Field of Classification Search
None
See application file for complete search history.

(56) References Cited

U.S. PATENT DOCUMENTS

| | | | |
|---|---|---|---|
| 9,688,489 B1 * | 6/2017 | Zevenbergen | ........... B25J 11/00 |
| 10,124,489 B2 | 11/2018 | Chitta et al. | |
| 2014/0142751 A1 | 5/2014 | Takizawa | |
| 2017/0246744 A1 | 8/2017 | Chitta et al. | |
| 2017/0282363 A1 * | 10/2017 | Yamada | ..................... B25J 9/16 |

FOREIGN PATENT DOCUMENTS

WO   WO-2015112018 A1 *   7/2015  .......... B25J 15/0014

* cited by examiner

*Primary Examiner* — Thomas E Worden
*Assistant Examiner* — Bryant Tang
(74) *Attorney, Agent, or Firm* — CHRISMAN GALLO TOCHTROP LLC

(57) ABSTRACT

An emptying system for emptying a box of food products comprising: —a box overturning robot (2) comprising gripping means (20); —acquisition means (3) for acquiring at least one image of at least one part of the box; —a control unit (4) that moves said gripping means (20) in function of the information arising from said acquisition means (3) for grasping the box by said gripping means (20).

6 Claims, 3 Drawing Sheets

SYSTEM AND METHOD FOR EMPTYING A BOX

TECHNICAL FIELD

The present invention relates to a system for emptying a box of food products, typically containing fruit and vegetables.

PRIOR ART

Systems for emptying boxes comprising a robot provided with two gripping forks that are inserted between two boxes superposed with each other for lifting the upper box are known. There are various types of boxes, each with its own and standardised dimensions.

The system also provides for the overturning of the box (also known as tipper in technical jargon) for emptying the contents into a collection tank.

On this point, systems are available which enable the box to be retained to the robot during the overturning.

Stacks of boxes are usually positioned in succession facing the robot. The robot grasps one box after the other, emptying them. This takes place starting from the highest box of the stack and then gradually moving down.

On this point the robot is programmed to insert the gripping forks at regular height intervals, pre-set as a function of the type of boxes to be moved. As a function of the geometry of the box, set manually by the user, the machine understands at which intervals it must insert the gripping forks in the stack. One drawback is connected with the poor operating flexibility. In particular, if not all the boxes were within the same dimensions there would be a problem as the system would attempt to insert the forks in an area that is actually occupied. Such an event could occur for example in the case in which:

a different sized box is placed in one stack for optimizing the filling of a container; or a box may have a broken foot and therefore not be able to maintain sufficient horizontality (or however have a positioning error).

Another drawback arises if in succession the system needs to process stacks of boxes in which, as the stack varies, the dimensions of the boxes vary. In fact, in this way, the machine set-up would have to be continuously repeated.

OBJECT OF THE INVENTION

In this context, the technical task underlying the present invention is to propose a system and a method for emptying boxes which enables the flexibility of use to be improved and the reduction of system setting costs to be reduced.

The defined technical task and the specified aims are substantially achieved by a system and method for emptying boxes, comprising the technical characteristics set forth in one or more of the appended claims.

BRIEF DESCRIPTION OF THE DRAWINGS

Further characteristics and advantages of the present invention will become more apparent from the approximate and thus non-limiting description of a preferred, but not exclusive, embodiment of a system and method for emptying boxes, as illustrated in the accompanying drawings, in which.

DETAILED DESCRIPTION OF PREFERRED EMBODIMENTS OF THE INVENTION

Figure 1:
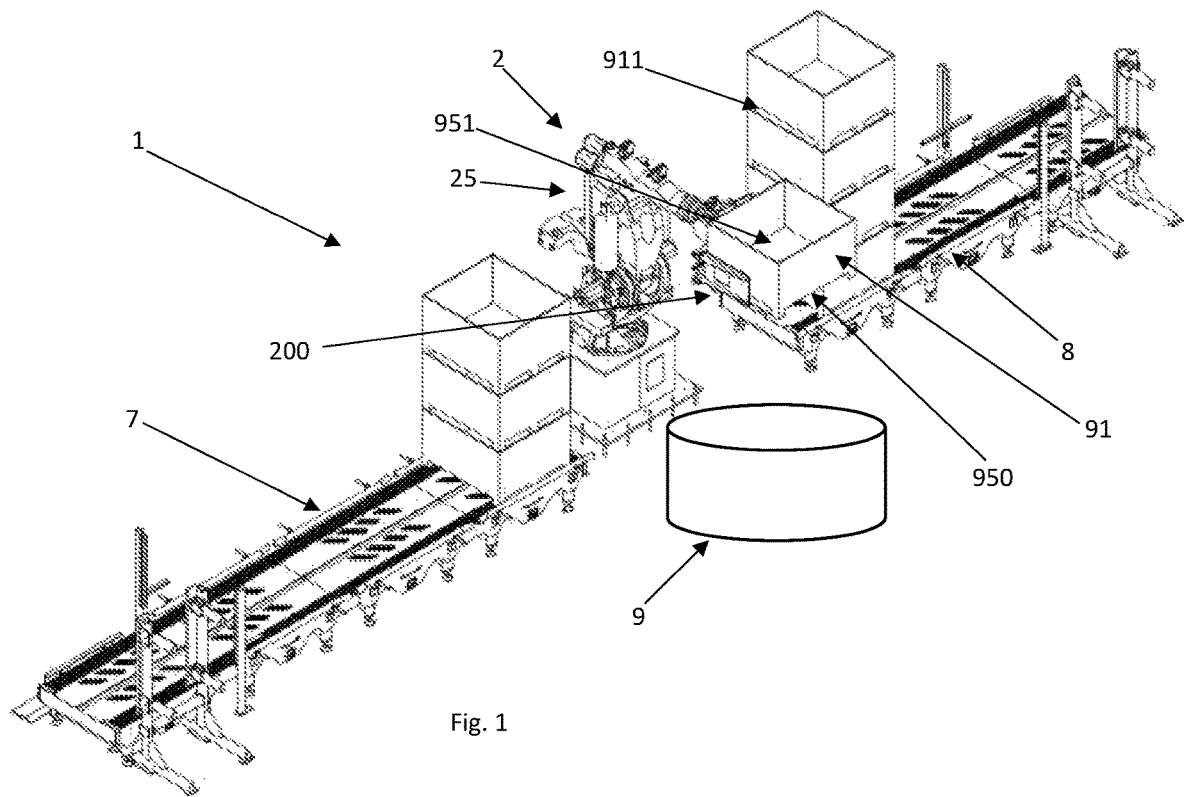
FIGS. 1 and 2 show two different views of a system for emptying a box according to the present invention.
Figure 2:
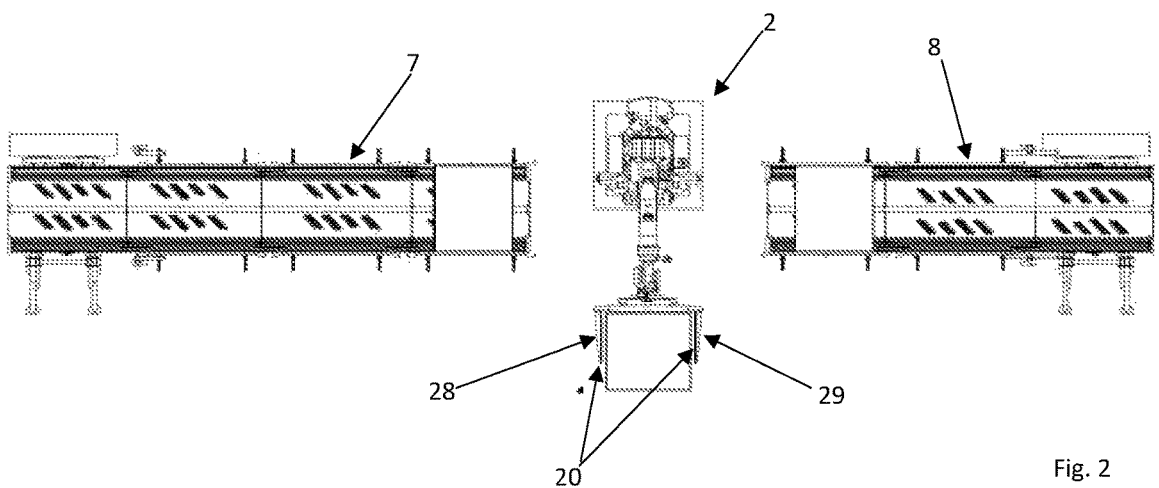
Figure 3:
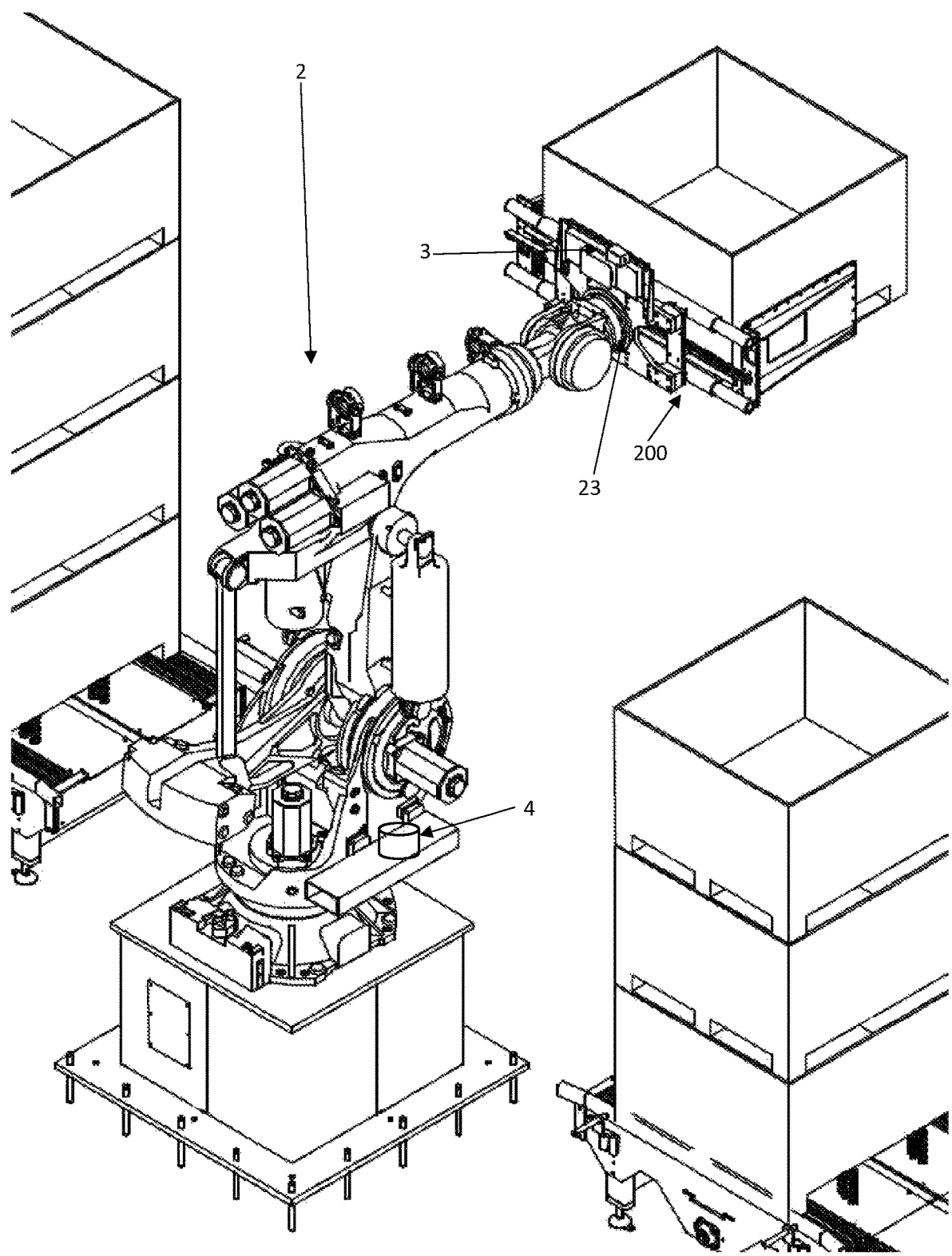
FIG. 3 shows a detail of the emptying system of FIGS. 1 and 2.

In the appended figures, reference number 1 denotes a system for emptying a box containing food products. Typically, the food products are fruit and/or vegetables.

The box is typically open at the top for facilitating the emptying of the products. In technical jargon the box is also known as a "tipper".

The emptying system 1 comprises a box overturning robot 2. Such robot 2 can for example comprise an articulated arm 25. Appropriately such robot 2 can have at least 2 or 4 axes, preferably 6 axes.

Appropriately, the robot 2 comprises gripping means 20.

The gripping means 20 is appropriately located at an end of the articulated arm 25.

Appropriately, the system 1 comprises an acquisition means 3 for acquiring at least one image of at least one part of the box. For example, the acquisition means 3 comprises/is a camera. For example, the means 3 can acquire a video or one or more images. On this point, it exploits known techniques for the recognition of an object (with a more or less expected shape) from an image. It is not therefore described in detail. In particular, it can define the perimeter and dimensions thereof.

Figure 4:
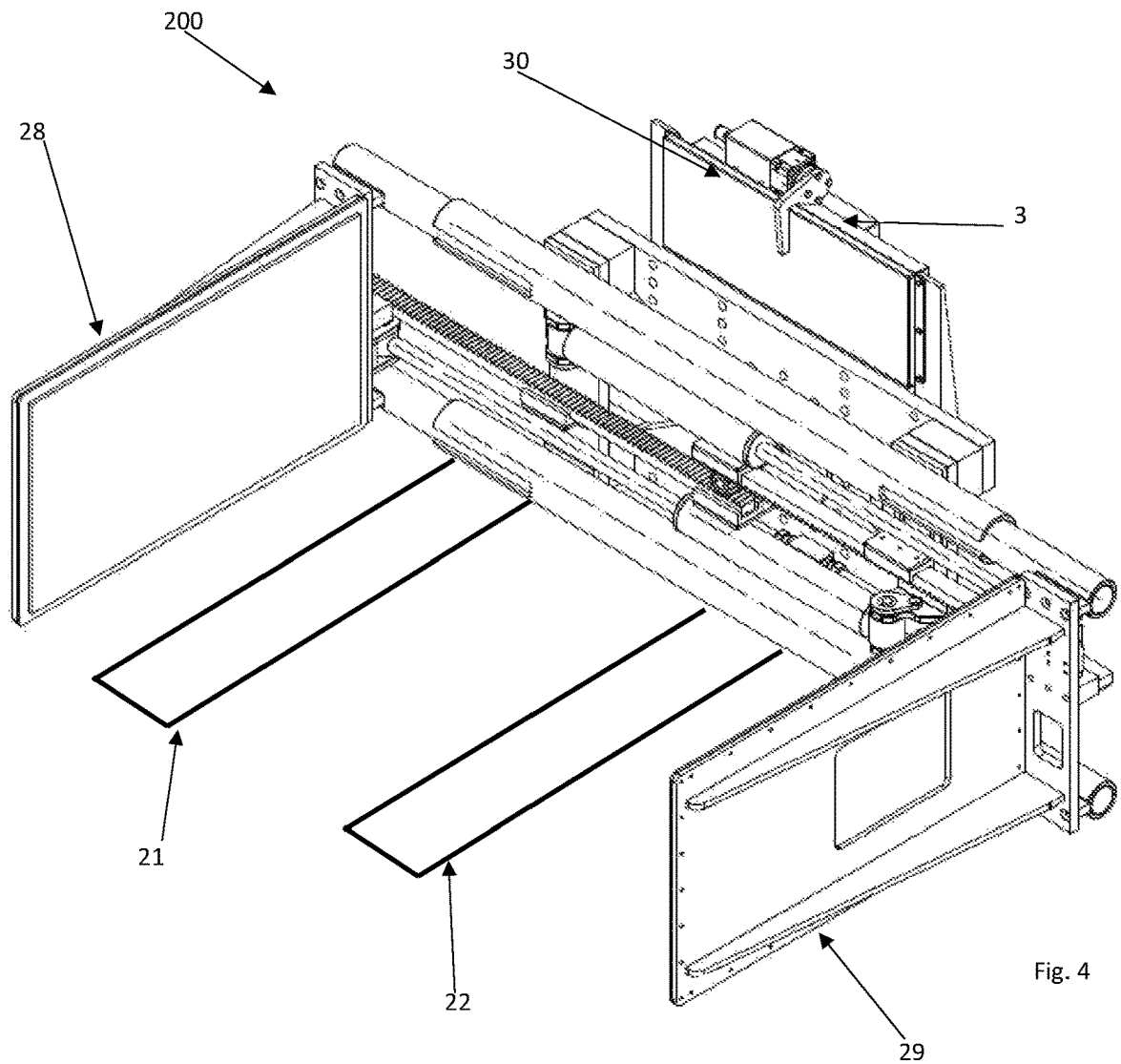
FIGS. 4 and 5 show two distinct views of a component of the system for emptying a box according to the present invention.
Figure 5:
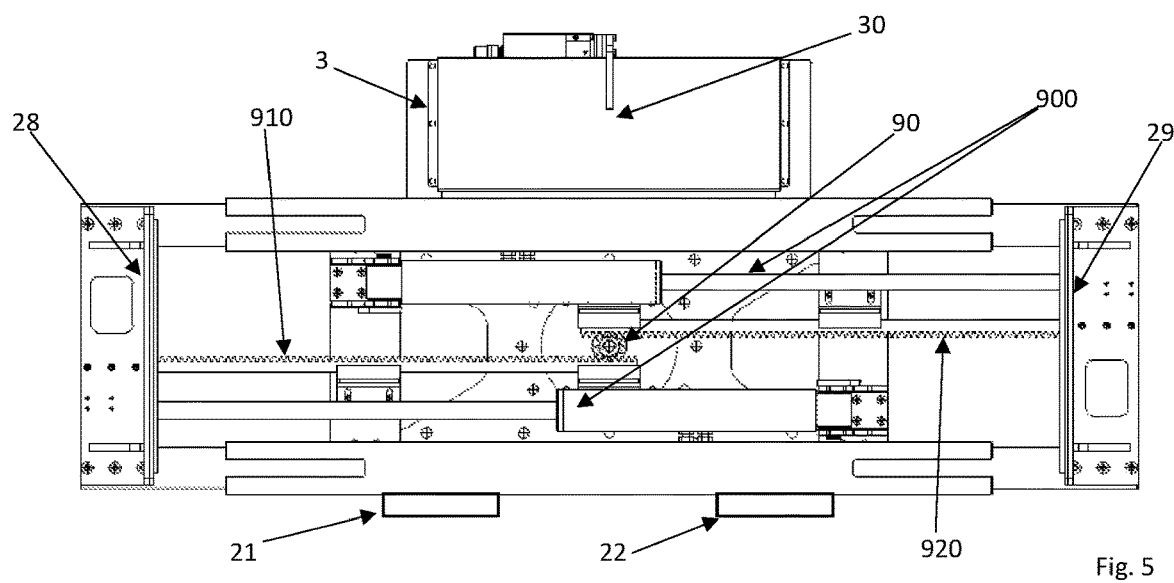

There may for example be an openable door 30 which in a closed configuration (see FIGS. 4 and 5) protects the acquisition means 3 and in an open configuration enables the acquisition means 3 to detect at least one image of the box.

The system 1 comprises a control unit 4 that moves said robot 2 and/or said gripping means 20 in function of the information arising from said acquisition means 3 for acquiring at least one image for grasping/picking up the box by said gripping means 20.

Appropriately, the gripping means 20 comprises at least a first fork 21 intended to be inserted in a zone 911 obtained in one of the boxes. The first fork 21 is a bar with a longitudinal extension. Advantageously it is flat. See for example FIG. 4 which shows that the first fork 21 is flattened. For example, it may even be longer than 70 centimetres, between 5 and 30 centimetres wide and between 0.5 and 3 centimetres thick (in height).

Typically, the zone 911 is located below a bottom of the box. Appropriately the bottom is a base which delimits at the bottom a compartment which supports the products. The zone 911 is preferably located interposed between the lower support feet of the box.

The gripping means 20 comprises a second fork 22. Appropriately, the second fork 22 is alongside the first fork 21. The first and second fork 21, 22 are parallel. Appropriately the robot 2 comprises a gripping head 200 which comprises the gripping means 20. Such gripping head 200 in turn comprises the first and the second fork 21, 22. The robot 2 comprises a rotatable wrist 23 to solidly tilt the first and the second fork 21, 22.

Appropriately, the rotatable wrist 23 enables the entire gripping head 200 to be rotated. The wrist 23 connects the gripping head 200 to remaining parts of the robot 2.

Additionally or alternatively to the fork(s), the gripping means 20 may appropriately comprise a clamp. In particular, the gripping means 20 (or more precisely the clamp) may comprise a first and a second lateral jaw 28, 29 which laterally clamp a box. This advantageously makes it possible to prevent the box from being able to separate itself from the robot 2 and fall when it assumes an overturned position (for emptying the contents by gravity). The first and the second jaw 28, 29 are movable between a rest position in which they are mutually distanced and a mutual nearing position in which they grasp the box. Appropriately the first and the second jaw 28, 29 can translate between the rest position and the mutual nearing position. Typically, they are moved by a fluid dynamic means 900, in particular a first and a second fluid dynamic piston. The first fluid dynamic piston activates the first jaw 28 and the second fluid dynamic piston activates the second jaw 29. The first and the second fluid dynamic piston are obtained on the gripping head 200. Appropriately, there is a system for synchronizing the movement of the first and the second jaw 28, 29. Such synchronization system comprises a toothed wheel 90 which can mesh with a first and a second rack 910, 920 connected to the first and to the second jaw 28, 29, respectively.

Appropriately, the gripping head 200 also comprises the first and the second jaw 28, 29. The first and the second jaw 28, 29 move in the gripping head 200 towards and away from each other; for example, they move with respect to the first fork 21. The wrist 23 may enable the rotation of the first fork 21, advantageously solidly constrained to the first and to the second jaw 28, 29.

Advantageously, the acquisition means 3 for acquiring at least one image is placed on said robot 2. Preferably, it is placed in proximity to the gripping head 200. Advantageously, the acquisition means 3 for acquiring at least one image is at least in part placed on the gripping head 200 or on the wrist 23. In this way, it is possible to obtain a better view of the box to be grasped and guide the robot 2.

Therefore, the acquisition means 3 provides information to the robot 2 on the movements that it must perform for inserting the first and/or the second fork 21, 22 in a slot between two superposed boxes and/or for positioning the box between the first and the second jaw 28, 29.

In an alternative solution the acquisition means 3 for acquiring at least one image may not be on board the robot. Appropriately, in that case, it would be placed in proximity to the robot 2. In any case, it would frame the box to be picked up (by the robot 2) in order to be able to identify at least one part of the box and guide the movement of the robot 2 and/or the gripping means 20.

Appropriately, the gripping head 200 can comprise a means for detecting the weight of one of the boxes placed on said at least one first fork 21.

Advantageously such detection means may comprise a load cell. One or more sensors of such load cell may be associated with the first and/or the second fork 21, 22. The system 1 therefore comprises a system for quantifying the product unloaded from each box on the basis of the difference between the weight determined by the detection means before and after the emptying of the box.

Appropriately, the acquisition means 3 for acquiring at least one image enables the detection of an identification code for the boxes. Typically, the acquisition means 3 for acquiring at least one image enables a code on the boxes to be read (e.g. a barcode or a QR code). In this way, it can determine information on the origin and/or supply chain and/or contents of the box. In a non-preferred alternative solution such identification code is determined through a detector that is distinct from the acquisition means 3 for acquiring at least one image. Appropriately, with just one image detected by the means 3 it is possible to obtain information for guiding the gripping means 20 and for determining such code.

Appropriately, the system 1 comprises the advancement means 7 for advancing a stack of boxes for positioning them at the robot 2. The advancement means 7 is located upstream of the robot 2. The advancement means 7 may for example comprise a conveyor, e.g. a conveyor chain or a conveyor belt.

The system 1 also comprises an ejection means 8 for ejecting the empty boxes. It is located downstream of the robot 2. Also in this case the ejection means 8 comprises a conveyor. Preferably, the ejection means 8 enables stacks of boxes to be moved.

The system 1 further comprises a collection tank 9 for collecting the food products. The food products unloaded from the boxes by the robot 2 are introduced into such collection tank 9.

The robot 2 is interposed between the advancement means 7 and the ejection means 8. Appropriately, the robot 2 on one side faces the advancement means 7, on one side faces the ejection means 8 and on one side faces the collection tank 9. Appropriately, the advancement means 7, the ejection means 8 and the collection tank 9 extend along three directrices which extend from the robot 2 with an interposed angle of 90°.

The subject matter of the present invention is also a method for emptying boxes of food products. Such method can be implemented for example by a box emptying system 1 having one or more of the features previously described.

Appropriately, the method comprises the step of picking up by gripping means 20 at least a first box 91 being part of said boxes.

The gripping means 20 is part of a robot 2. In particular, it is located at a gripping head 200 placed at one end of the robot 2.

The method comprises a step of identifying a position of at least a part of said first box 91. In particular, the relative position between the gripping means 20 and the first box 91 is determined. The step of identifying a position of at least a part of the first box 91 comprises the steps of:

acquiring at least one image of at least one part of the first box 91 by the acquisition means 3 for acquiring at least one image; this envisages taking one or more photographs or making a video; this takes place before the gripping means 20 grasps the first box 91 (as such step is to be performed prior to this operation).

determining information on a position (in space) of at least one part of the first box 91 in function of data coming from said at least one image.

Appropriately, this takes place using a means for processing the data acquired by the acquisition means 3.

In the preferred solution the method envisages acquiring a single image of the first box 91, preferably such single image relates to the front of the first box 91. The information related to the position in space of said at least one part of the first box 91 is determined by said individual image without the need for additional images. For picking up the first box 91 using the gripping means 20, said robot 2 is guided by the information indicated above.

Preferably, the robot 2 is guided by the information determined by an individual image. In a non-preferred alternative solution, the acquisition means 3 could iteratively acquire a plurality of images able to check and possibly correct the trajectory of the gripping means 20.

In the preferred solution, the step of acquiring at least one image takes place by means of the acquisition means 3 for acquiring at least one image comprising a chamber placed on the robot 2. During the step of acquiring at least one image the acquisition means 3 faces the first box 91 (and appropriately is located at the same height).

The step of picking up by the gripping means 20 the first box 91 may comprise a step of introducing a first fork 21 in a first zone 911 of the first box 91. Appropriately, the step of introducing the first fork 21 in the first zone 911 envisages inserting said first fork 21 into a slot 950 below a bottom 951 of the first box 91. Such bottom 951 is a base intended to support the products in the first box 91. In particular, such slot 950 is interposed between the feet of the first box 91. Appropriately, such slot 950 is interposed between the first box 91 and a box below. If inserted into the slot 950 the first fork 21 can lift the first box 91. Such slot 950 is located between the bottom 951 of the upper box and an upper edge of the box immediately below (the upper box rests on the edge immediately below). Such slot 950 may be open at the bottom or define a channel at least partially closed towards the bottom.

The zone 911 is identified by an acquisition means 3 for acquiring at least one image. The step of picking up the first box 91 by the gripping means 20 may comprise a step of introducing a second fork 22 into said zone 911 of the first box 91 placed below the bottom of the first box 91. The second fork 22 is alongside the first fork 21. Between the first and the second fork 21, 22 there is an empty space (at least before the gripping means 20 constrains the first box 91). The first and the second fork 21, 22 are appropriately inserted into the same slot 950 (below the bottom of the first box 91).

Appropriately, the second fork 22 is specular to the first fork 21.

Advantageously, the use of two forks enables more stability to be given to the boxes picked up by the gripping means without oversizing the forks themselves in width.

The method further comprises a step of emptying the food products placed in the first box 91 by at least partially overturning the first box 91 and tipping out the food products contained. This takes place by rotating the gripping head 200.

Appropriately, during the overturning of the first box 91 the gripping head 200 clamps the first box 91 by a first and a second jaw 28, 29. They act by laterally clamping the first box 91. In particular, they clamp two lateral flanks of the first box 91 trapping it. Appropriately, the step of clamping the first box 91 by the first and the second jaw 28, 29 takes place during the step of picking up the first box 91 by the gripping means 20. The step of picking up the first box 91 by the gripping means 20 therefore comprises the step of grasping the first box 91 by the first and the second jaw 28, 29.

Preferably, the step of determining information on the position in space of at least a part of the image takes place preferably with an overall matching pattern of the first box 91. Therefore, the shape of the first box 91 is identified based on a plurality of references. Having defined the shape, it is deduced that:
- the first zone 911 is immediately below the bottom of the first box 91, and/or
- the flanks of the first box 91 are located on the sides of the first box 91.

The image acquisition means 3 can therefore identify the overall dimensions of the first box 91, identifying the position of the slot 950 described above (placed between the first box 91 and the box below) and/or the lateral flanks. This enables the guiding of the positioning of the first and/or of the second fork 21, 22, respectively, in the slot 950 and/or of the first and the second jaw 28, 29 on the lateral flanks of the first box 91.

Appropriately, the method can comprise the step of tilting a gripping head 200 with respect to a horizontal plane for compensating any horizontality errors of the first box 9 (e.g. as a result of one of the feet of the box breaking). For example, this can envisage a rotation about a horizontal axis (e.g. such axis can be substantially parallel to the extension direction of the first fork 21; appropriately such axis extends and remains confined between two vertical planes passing respectively through the first and the second fork 21, 22, or between the first and the second jaw 28, 29). Appropriately, this can require a rotation of a wrist 23 (preferably articulated or rotatable) which connects said gripping head 200 to other parts of the robot 2.

Appropriately, the acquisition means 3 for acquiring at least one image reads a code located on the first box 91, e.g. a barcode or a QR code. This provides greater traceability of the supply chain. Appropriately, the step of reading the code on the first box 91 substantially takes place in combination with the step of identifying the position of at least one part of the first box 91.

Appropriately, the method for emptying the boxes envisages picking up a box which is located on a stack of boxes and then emptying it. Typically the box located at the top of the stack is picked up. On this point, the method comprises the step of advancing a stack of boxes as far as the robot 2. In this way, the robot 2 can pick up the first box 91 from the stack.

Subsequently, the boxes are picked up, typically one after the other, by the robot 2.

The method also comprises the step of detecting by at least one sensor a height at which the first box 91 is located that is placed on a stack of boxes.

Such at least one sensor is not placed on board the robot 2. It is typically static. This could for example take place by a plurality of photocells that extend in succession between the top and the bottom. Or it could take place by a scanner, typically a vertical scanner. In that case, said at least one sensor comprises the plurality of photocells or the scanner. The step of detecting the height at which the first box 91 is located occurs before the step of picking up by the gripping means 20 the first box 91. In fact, in this way, said at least one sensor provides a first indication of where the acquisition means 3 needs to be positioned for determining the geometry of the first box 91 (in order to identify the flanks of the first box 91 and/or the slot 950 between the bottom 951 of the first box 91 and that of the box below).

The method conveniently comprises the step of:
- picking up the first box 91 from a stack of boxes as explained above and emptying the contents thereof by overturning them into a collection tank 9;
- positioning the first empty box 91 in an unloading zone, appropriately placed along an ejection line for ejecting empty boxes (typically a conveyor).

Appropriately in the unloading zone the empty boxes are stacked on top of one another. In the unloading zone the gripping means 20 releases the first box 91. On this point, the first and the second jaw 28, 29 release the first box 91 by moving away from each other. Also the first and/or the second fork 21, 22 (if provided) are removed from the first box 91.

The step of picking up the first box 91 is preceded by the step of moving a stack of boxes towards the robot 2 typically by a conveyor belt.

The method then envisages the step of iteratively repeating for the other boxes in the stack what has been described for the first box 91. This takes place starting from the highest one and moving towards the lowest one.

Advantageously, the boxes in the unloading zone are stacked on top of one another empty. Thus, they can be periodically removed in a group, optimizing the process.

Appropriately, the method comprises the step of comparing the information coming from said acquisition means 3 with pre-stored models. In this way, the system enables the first box to be associated with one of the pre-stored models.

Therefore, the method envisages autonomously recognizing which model is to be attributed to the first box 91. This enables/facilitates the handling thereof.

Possibly, the method envisages storing a new model of box. Such step envisages acquiring an image of the new model of box by the acquisition means 3. Furthermore, the method envisages the operator guiding (manually controlling) the gripping means 20 until grasping the new model of box. In this way, the method has information on where to position the gripping means 20 for correctly grasping such new model of box.

The present invention achieves important advantages. In fact, it enables the stacked boxes to be picked up without the robot knowing beforehand what type of boxes they are. This enables boxes of a first type to be emptied and then boxes of a second type to be emptied without the need for any down time for the set up of new boxes (i.e. for manually instructing the machine on the geometry of the boxes). It also offers maximum flexibility, e.g. in situations in which a box is not correctly positioned, e.g. because one of the feet is broken.

The invention as it is conceived is susceptible to numerous modifications and variants, all falling within the scope of the inventive concept characterised thereby. Furthermore, all the details can be replaced with other technically equivalent elements. In practice, all the materials used, as well as the dimensions, can be any whatsoever, according to need.

The invention claimed is:

1. A method of emptying boxes of food products comprising the steps of:
    picking up by gripping means (20) at least one first box (91) being part of said boxes;
    said gripping means (20) being part of a robot (2);
    emptying the first box (91) overturning at least partially the first box (91) and overturning the food products contained therein;
    wherein the method comprises a step of identifying a position of at least one part of said first box (91) that in turn comprises the steps of:
    i) acquiring at least one image of at least one part of the first box (91) by acquisition means (3) for acquiring at least one image;
    ii) determining information on a position of at least one part of the first box (91) in function of data coming from said at least one image; in said step of picking up the first box (91) by the gripping means (20), said robot (2) being guided by said information;
        wherein the step of picking up by the gripping means (20) the first box (91) comprises the step of introducing a first fork (21) in a zone (911) of the first box (91) placed below a bottom of the first box (91); said bottom bounding below a compartment containing the products; said first zone (911) being identified by the acquisition means (3) for acquiring at least one image.

2. The method according to claim 1, characterized in that said acquisition means (3) for acquiring at least one image comprises a camera placed on the robot (2).

3. The method according to claim 1, characterized in that the step of picking up by the gripping means (20) the first box (91) comprises the step of introducing a second fork (22) in said zone (911) of the first box (91) placed below the bottom of the first box (91), said second fork (22) being alongside the first fork (21).

4. The method according to claim 3, characterized in that tilting a gripping head (200) with respect to a horizontal plane comprising the first and the second fork (21, 22) for compensating horizontality errors of the first box (9).

5. The method according to claim 1, characterized by advancing a stack of boxes as far as said robot; the step of picking up by gripping means (20) at least one first box (91) involves picking up said first box (91) that is placed on the top of said stack.

6. The method according to claim 1, characterized in detecting by at least one sensor a height at which said first box (91) is located that is placed on a stack of boxes; the step of detecting said height at which the first box (91) is located occurring before the step of picking up by means (20) said first box (91); said at least one sensor being distinguished by the acquisition means (3) for acquiring at least one image.

* * * * *